United States Patent
Fourre et al.

(10) Patent No.: US 10,380,408 B2
(45) Date of Patent: Aug. 13, 2019

(54) METHOD OF DETECTING FRAUD

(71) Applicant: IDEMIA IDENTITY & SECURITY FRANCE, Issy les Moulineaux (FR)

(72) Inventors: Joël-Yann Fourre, Issy les Moulineaux (FR); Jean Beaudet, Issy les Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 0 days.

(21) Appl. No.: 15/948,371

(22) Filed: Apr. 9, 2018

(65) Prior Publication Data
US 2018/0300528 A1   Oct. 18, 2018

(30) Foreign Application Priority Data

Apr. 12, 2017   (FR) ...................................... 17 53180

(51) Int. Cl.
*G06K 9/00* (2006.01)
(52) U.S. Cl.
CPC ......... *G06K 9/0012* (2013.01); *G06K 9/0004* (2013.01); *G06K 9/00087* (2013.01); *G06K 2009/0006* (2013.01)
(58) Field of Classification Search
CPC . G06K 9/0012; G06K 9/0004; G06K 9/00087
See application file for complete search history.

(56) References Cited

U.S. PATENT DOCUMENTS

| 10,089,514 | B1* | 10/2018 | Shen | G06K 9/0002 |
| 2014/0361395 | A1* | 12/2014 | Bhagavat | H01L 27/14634 |
| | | | | 257/448 |
| 2016/0227142 | A1* | 8/2016 | Lin | G06K 9/00013 |
| 2017/0177960 | A1* | 6/2017 | Boulanger | G06K 9/00087 |
| 2018/0012057 | A1* | 1/2018 | Cho | G06F 21/32 |

FOREIGN PATENT DOCUMENTS

| EP | 2 495 697 A1 | 9/2012 |
| FR | 2757974 A1 | 7/1998 |
| FR | 3015728 A1 | 6/2015 |
| WO | 2015/091701 A1 | 6/2015 |

OTHER PUBLICATIONS

Nov. 24, 2017 Search Report issued in French Patent Application No. 1753180.

* cited by examiner

*Primary Examiner* — Mia M Thomas
(74) *Attorney, Agent, or Firm* — Oliff PLC; R. Brian Drozd (57) ABSTRACT

Provided is a method of detecting fraud during use of a device for capturing an imprint of a body part using a principle of total internal reflection with dark field and including a transparent plate on which a body part to be verified is placed. The method includes: using the device to acquire a first imprint image with a lighting of the body part such that the whole surface of the body part in contact with the transparent plate returns light; using the device to acquire a least one second imprint image by illuminating the body part with a single LED; obtaining for each second imprint image an item of information representative of a light level re-emitted by the body part by using each image obtained; and comparing each item of information obtained with a reference item of information to validate that the body part is a true body part.

15 Claims, 5 Drawing Sheets

METHOD OF DETECTING FRAUD

The invention relates to a method of detecting fraud during use of a device for capturing an imprint of a body part using a principle of total internal reflection with dark field.

CONTEXT OF THE INVENTION

The use of imprints of the digits, such as for example an imprint of a finger, of a plurality of fingers, of a palm of a hand, allows to secure access to buildings or to machines. Using this technology allows to strengthen security in so far as the probability that two people have two identical fingerprints is almost zero.

A fingerprint capture device allows to capture an image of a fingerprint. In the case of identification, this imprint is compared with a set of reference fingerprints contained in a database. In the case of authentication, this imprint is compared with a single fingerprint. Comparison allows to determine whether or not the fingerprint captured belongs to a person referenced in the database or whether the person is indeed who they purport to be. Certain ill-intentioned individuals attempt to have themselves identified (respectively authenticated) fraudulently by using decoys to induce the identification (respectively authentication) devices to make an error.

Various validation methods are known for validating the fact that the skin present in front of the device for capturing an imprint is true and therefore that the finger bearing the fingerprint is a true finger.

Certain known methods rely entirely on an analysis of images, in particular by identifying artefacts of perpetration of frauds. However, these methods are not robust to mindful frauds.

Other methods are also known for capturing a series of images of the finger and for measuring for example sweating, pulse, oximetry, the whitening of the finger while it is pressed on the capture surface.

However, such methods require an acquisition time that cannot be compressed since it is related to the rate of evolution of the observed phenomenon, thus degrading the ergonomy of the sensor.

Document FR3015728 describes a method allowing to validate that a body element such as a lower surface of one or more fingers or the palm of a hand is covered with a true skin. The principle consists more precisely in illuminating the surface of the element with the aid of a light source allowing to illuminate just a well-defined zone, termed the illuminated zone, of the element and to preserve a zone without direct illumination, termed the scattering zone. An image of these two zones is thereafter captured and analysed to deduce therefrom that the said element is covered with a true skin or with a false skin. In one embodiment of this method, an analysis zone covering the illuminated zone and the scattering zone is cut up into several calculation zones. An average light intensity of the pixels is thereafter calculated for each calculation zone, thereby allowing to obtain a curve of light intensity and a curve of the light intensity gradient as a function of the distance of the calculation zone from the limit of the illuminated zone and compare characteristics of these curves with those extracted from reference curves.

In the previous scheme, only the light rays arising from the body element resulting from scattering in the body element are used. The scheme would be improved if it was possible to easily obtain an image of the body element representing only light rays arising from scattering in the body element.

It is desirable to alleviate these drawbacks of the prior art. It is in particular desirable that this method be implementable in a time which is acceptable to a user.

DISCLOSURE OF THE INVENTION

According to a first aspect of the invention, the invention relates to a method of detecting fraud during use of a device for capturing an imprint of a body part using a principle of total internal reflection with dark field, the said device comprising a first transparent plate (120) comprising an upper face on which is placed a body part to be verified, a light source (121) comprising a plurality of LEDs illuminating exclusively in the direction of the upper face, a light-opaque screen situated below the first transparent plate, a second transparent plate situated below the opaque screen and an image sensor (124) situated below the second transparent plate (123), the two transparent plates, the opaque screen and the image sensor being parallel and the opaque screen (122) comprising a network of holes intended to let light rays arising from the light source reach the said image sensor (124), the said light rays allowing the image sensor to generate an image of the said imprint, characterized in that the method comprises:

using the said device to acquire (61) a first imprint image with a lighting of the body part to be verified by the light source, termed the first type of lighting, such that the whole surface of the body part to be verified in contact with the transparent plate returns light;

using the said device to acquire (63) at least one second imprint image with a lighting of the body part to be verified by the light source, termed the second type of lighting, such that at least one LED is lit up; when a plurality of LEDs is lit up, the said LEDs are at least a predefined distance apart such that the sub-part of the finger D returning the light emitted by an LED is disjoint from any other sub-part of the finger D returning light illuminated by another LED;

obtaining (67) for each second imprint image an item of information representative of a light level re-emitted by the body part to be verified by using the said second imprint image and the first imprint image; and comparing (68) the said item of information with a reference item of information representative of a light level re-emitted by a true body part placed on the transparent plate so as to validate that the body part to be verified is a true body part.

In this manner, detection of fraud is thereby improved.

According to one embodiment, the item of information representative of a light level re-emitted by the body part to be verified comprises at least one curve representing a light intensity emitted by the body part and/or at least one curve of gradients of light intensity emitted by the body part as a function of a distance from a centre of a zone directly illuminated by the light source when the latter illuminates the body part according to the second type of lighting, each curve being obtained by taking into account only light intensities of pixels corresponding to ridges of the imprint of the body part, the said pixels being identified by using the first imprint image.

According to one embodiment, the item of information representative of a light level re-emitted by the body part to be verified comprises at least one curve representing normalized scalar products calculated between the first and the second imprint images and/or at least one curve representing gradients of normalized scalar products calculated between the first and the second imprint images, as a function of a distance from a centre of a zone directly illuminated by the light source when the latter illuminates the body part according to the second type of lighting.

According to one embodiment, the item of information representative of a light level re-emitted by the body part to be verified furthermore comprises an albedo measurement, the said measurement being obtained on the basis of the first imprint image.

According to one embodiment, when a plurality of LEDs is lit up simultaneously to obtain a second imprint image, the obtaining of the item of information representative of a light level re-emitted by the body part to be verified and the comparison of the said item of information with a reference item of information are performed for each sub-part so as to validate that the body part to be verified is a true body part.

According to one embodiment, when a plurality of second imprint images is obtained, the second type of lighting is modified for each second imprint image and the obtaining of the item of information representative of a light level re-emitted by the body part to be verified and the comparison of the said item of information with a reference item of information are performed for each second imprint image so as to validate that the body part to be verified is a true body part.

According to one embodiment, the modification of the second type of lighting consists in varying the wavelength emitted by the lighting system or the position of each lit-up LED of the lighting system for each second imprint image.

According to one embodiment, prior to the acquisition of each second image, the method comprises choosing at least one LED to be lit up for the acquisition of each second image according to a first predefined criterion by using the first image. According to one embodiment, the method furthermore comprises locating the finger in the first image and choosing each LED to be lit up as a function of the position of the finger thus located.

According to one embodiment, when a boundary separating two zones is detected in the first imprint image, a first second imprint image is acquired by illuminating the body part with a first LED generating a sub-part returning light on a first side of the boundary and a second second imprint image is acquired by illuminating the body part with a second LED generating a sub-part returning light on a second side of the boundary, and the items of information representative of a light level re-emitted by the body part to be verified which arise from each second image having to be similar according to a second predefined criterion so as to validate that the body part to be verified is a true body part.

According to one embodiment, when a single LED is chosen, the LED chosen is the LED closest to a position of a barycentre of the body part in contact with the transparent plate or closest to a centre of curvature of the ridges of the imprint of the body part in contact with the transparent plate, or closest to a barycentre of minutiae detected in the ridges of the said imprint.

According to one embodiment, the method furthermore comprises: acquiring an additional imprint image without lighting by the light source; performing a subtraction of the additional imprint image from the first and from each second image so that the first and each second imprint image used during the obtaining of the item of information representative of a light level re-emitted by the body part to be verified and the comparison of the said item of information with a reference item of information are images arising from this subtraction.

According to a second aspect of the invention, the invention relates to a device comprising means for implementing the method according to the first aspect.

According to a third aspect of the invention, the invention relates to an item of equipment comprising a device according to the second aspect.

According to a fourth aspect, the invention relates to a computer program, comprising instructions for implementing, by a device, the method according to the first aspect, when the said program is executed by a calculation unit of the said device.

According to a fifth aspect, the invention relates to storage means, storing a computer program comprising instructions for implementing, by a device, the method according to the first aspect, when the said program is executed by a calculation unit of the said device.

BRIEF DESCRIPTION OF THE DRAWINGS

The above-mentioned characteristics of the invention, as well as others, will become more clearly apparent on reading the following description of an exemplary embodiment, the said description being given in conjunction with the attached drawings, among which.

DETAILED DESCRIPTION OF DIVERSE EMBODIMENTS

The description which follows details more particularly embodiments of the present invention in a smartphone context. The invention can apply to other items of equipment that may comprise a device for capturing an imprint of a body part, such as a computer, a tablet, an entry/exit control device in a building, etc. Moreover, the invention is described in a context where the body part is a finger. It applies, however, to other body parts such as several fingers, a palm of a hand, etc.

Figure 1:
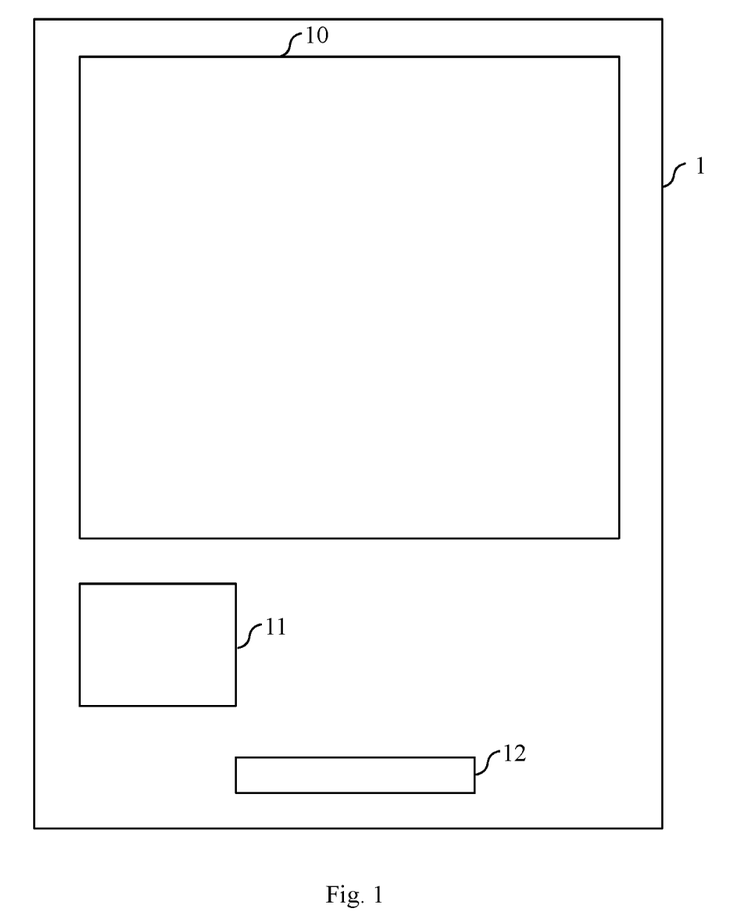
FIG. 1 schematically illustrates an item of equipment comprising a device for capturing an imprint of a body part according to the invention.

FIG. 1 schematically illustrates an item of equipment comprising a device for capturing a imprint of a body part according to the invention.

The item of equipment 1 is here a smartphone comprising a screen 10, a processing module 11 and a device for capturing an imprint of a body part 12. Hereinafter, we call the device for capturing an imprint of a body part a biometric device. The processing module 11 can implement several functionalities of the item of equipment 1 comprising in particular processings of the data arising from the biometric device 12, as we describe further on in conjunction with FIG. 6. The biometric device 12 is for example used by an owner of the item of equipment 1 to authenticate himself with the item of equipment 1 and thus be able to use it.

In a particular implementation, the device for capturing an imprint of a body part 12 is integrated into the screen 10.

Figure 2:
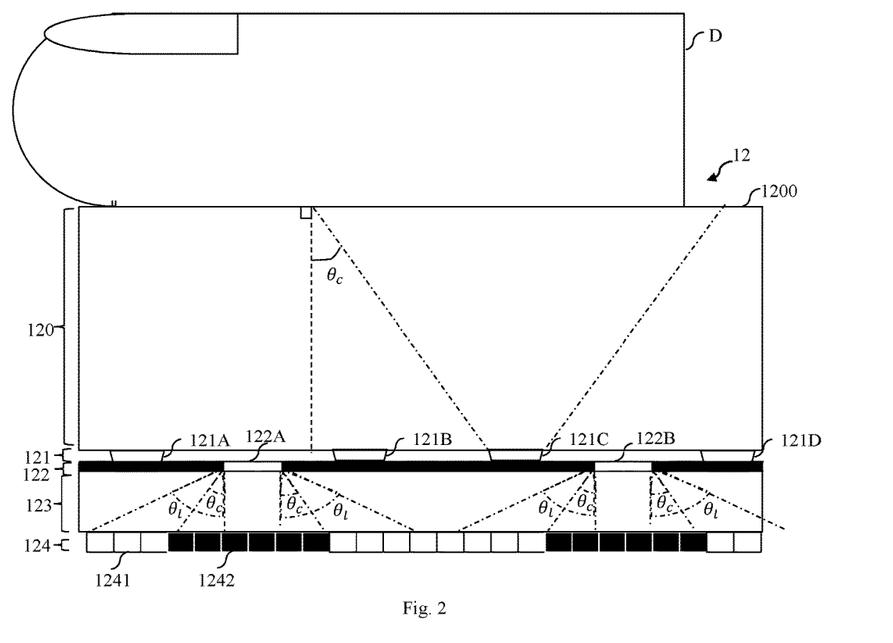
FIG. 2 schematically illustrates a first embodiment of a device for capturing an imprint of a body part.

FIG. 2 schematically illustrates a first embodiment of the biometric device 12 adapted to implement the method according to the invention.

The biometric device 12 uses the principle of total internal reflection with dark field that we recall hereinbelow in conjunction with FIG. 5.

Figure 5:
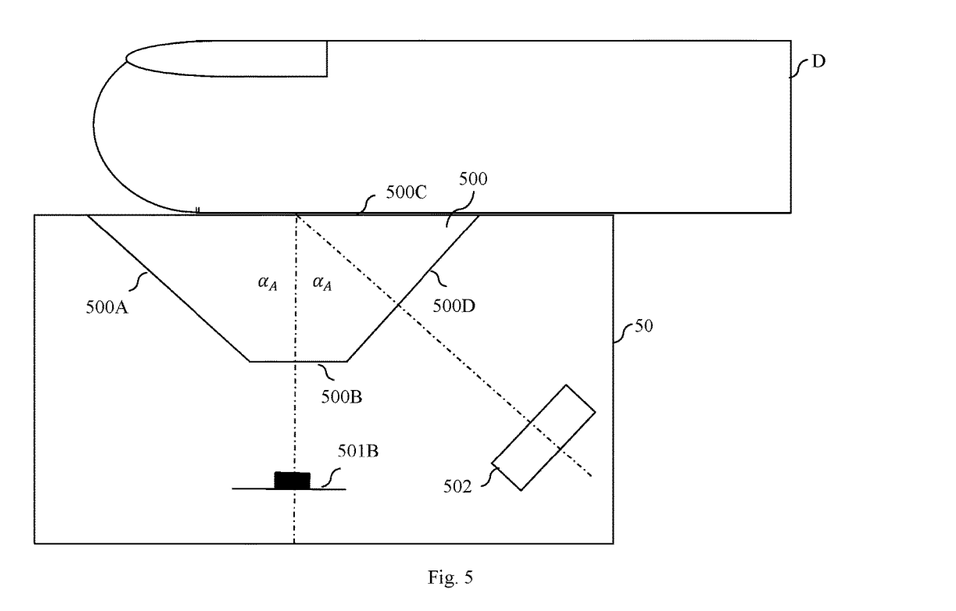
FIG. 5 schematically describes a device for capturing a fingerprint of the prior art working in total internal reflection operating in a dark field.

FIG. 5 schematically describes a device for capturing a fingerprint working in total internal reflection and operating in a dark field.

The device 50 described in FIG. 5 comprises a prism 500, a light source 501B, and an optical system 502 such as for example a CCD ("Charge-Coupled Device") or CMOS ("Complementary Metal Oxide Semiconductor") sensor and one or more lenses.

The light source 501B generates a light beam which passes through a first face 500B of the prism 500 to a second face 500C of the prism 500 where a finger D is positioned. The light beam generated by the light source 501B forms an incident angle $\alpha_B$ with the normal to the face 500C smaller than a critical angle $\theta_c$ and than a limit angle $\theta_l$ (here, the incident angle $\alpha_B$ is zero degrees). The critical angle $\theta_c$ (resp. the limit angle $\theta_l$) is defined as the angle beyond which total internal reflection occurs when a beam reaches the face 500C when the second medium is air (resp. when the second medium is the finger D). The light beam generated by the source 501B is therefore not reflected totally by the face 500B.

The optical system 502 receives the light beam generated by the source 501B after scattering by the finger D. The optical system 502 is configured so as to receive light beams after scattering in the finger D forming an angle lying between the critical angle $\theta_c$ and the limit angle $\theta_l$ with the normal to the face 500C. The optical system 502 therefore receives only light beams resulting from scattering in the finger D but no light beam resulting from reflection on the upper face 500C. The optical system 502 forms an image of the fingerprint with strong contrast between the valleys and the ridges of the fingerprint. The ridges correspond to scattered light beams, in part absorbed in the finger D and which have emerged from the finger at the level of the ridges in contact with the face 500C so as to reach the optical system 502. No light beam scattered in the finger D and emerging from the finger D at the level of the valleys can reach the optical system 502 since they cannot pass through the air layer and thereafter propagate in the prism 500 while forming a greater angle with respect to the normal to the face 500C than the critical angle $\theta_c$. The ridges therefore appear brighter in the imprint image than the valleys. A similar device can be found in French patent FR2757974.

The critical angle $\theta_c$ is given by the following formula:

$$\theta_c = \arcsin\left(\frac{n_0}{n_1}\right)$$

$n_1$ being the refractive index of the prism and $n_0$ being the refractive index of the air or of the finger. For a refractive index of the air equal to "1" and a refractive index of the prism equal to "1.5", a critical angle $\theta_c$=41.8 degrees is obtained. The refractive index of the skin is, in the region of the visible, between "1.41" and "1.47". By considering the minimum value of "1.41", a limit angle $\theta_l$ of "70" degrees is therefore obtained. By considering the maximum value, an angle $\theta_l^{max}$ of "76" degrees is obtained.

Returning to FIG. 2, the biometric device 12 comprises a plurality of optically coupled elements comprising:
- a first transparent plate 120 of thickness $E_{120}$ comprising an upper face 1200 on which can rest the body part (here the finger D) bearing the fingerprint to be imaged;
- a light source 121, composed here of LEDs, adapted to illuminate the finger D. Four LEDs 121A, 121B, 121C and 121D are represented in FIG. 2;
- a light-opaque screen 122 situated below the first transparent plate 120;
- a second transparent plate 123 of thickness $E_{123}$ situated below the opaque screen 122;
- a sensor 124 comprising light-sensitive photoreceptors, situated below the second transparent plate 123.

The transparent plates 120 and 123 have a refractive index greater than a predefined minimum refractive index $n_{min}$ greater than the refractive index of the air.

In a particular implementation, this minimum refractive index $n_{min}$ is greater than the refractive index of the finger, more particularly greater than 1.47. It is indeed known that when the refractive index of at least the second plate 123 is greater than the refractive index of the finger, the image of the finger is of finite extent.

Hereinafter in the disclosure, for simplicity, we assume that the two transparent plates 120 and 123 have an identical refractive index equal for example to "1.5".

It should be understood by optically coupled that a ray travelling from the upper face of the first plate to the lower face of the second plate does not pass through any medium of index smaller than $n_{min}$. This can be done in the case of two glass plates for example by cementing the two plates with a cement of sufficient refractive index.

The faces of the transparent plates 120 and 123, the opaque screen 122 and the sensor 124 are parallel. Here, the opaque screen 122 and the sensor 124 are considered to be plates of smaller thickness than the thickness of the two transparent plates 120 and 123.

Each LED of the light source 121 is adapted to generate a light beam above the opaque screen 122 in the direction of the upper face 1200. Each LED is configured in such a way that each light ray emanating from this LED has a low incident angle with respect to the normal to the upper face 1200 and in all cases smaller than the critical angle $\theta_c$. In this manner, no light ray emanating from an LED of the light source 121 undergoes total internal reflection on the upper face 1200. With such a configuration of the light source 121, the whole surface of the finger D opposite the face 1200 is not illuminated directly. Only well-defined zones, termed illuminated zones, of restricted dimensions (i.e. quasi-point-like) are illuminated directly by each LED. In order for the whole of the finger D opposite the upper face 1200 to return light, the LEDs of the light source 121 are configured in such a way that each LED and the LED or LEDs which are the nearest neighbours of the said LED generate on the finger D parts illuminated directly by the LEDs which are a distance $\delta$ apart which is smaller than a predefined distance $d_p$, characteristic of a depth of penetration of the light into the finger D. The distance $\delta$ is the minimum distance between two boundaries of illuminated parts. The predefined distance $d_p$ varies from about a millimeter for blue light to a few centimeters for infrared light. The sensor 124 therefore receives light beams arising from a scattering by the finger D of the light rays produced by the light source 121. The biometric device 12 is therefore a device for capturing a fingerprint working in total internal reflection with dark field.

The opaque screen 122 is a thin layer which can be produced for example by printing or by depositing an opaque coating on the plate 123. The opaque screen 122 is, however, not totally opaque since it is composed of a network of holes. Each light ray directed towards the sensor 124 which reaches the opaque screen 122 at the level of a hole passes through the opaque screen 122 and reaches the sensor 124.

In a particular implementation, the opaque screen 122 is a thin layer which can be produced by printing or by depositing an absorbent coating on the upper face of the transparent plate 123 or on the lower face of the transparent plate 120 such as a metallic deposition. Each hole of the opaque screen 122 is filled with a material having a greater refractive index than the predefined minimum refractive index $n_{min}$.

The sensor 124 is for example a CCD sensor or a CMOS sensor composed of a matrix of photoreceptors (such as the photoreceptor 1241) sensitive to the wavelength (or to the wavelengths) of the light beams emitted by the light source 121. The sensor 124 is optically coupled to the plate 123. The sensor 124 receives light passing through the holes of the opaque screen 122 and generates items of information on the basis of the light received which are used by the processing module 11 to produce an imprint image. The imprint image thus produced is composed of a matrix of pixels, each pixel arising from one or more photoreceptors. To obtain good contrast between the ridges and the valleys of the fingerprints, only the light rays arising from the finger D having an angle of incidence with respect to the normal to the upper face 1200 lying between the critical angle $\theta_c$ and the limit angle $\theta_l$ are considered.

In order to prevent the light rays having a smaller angle of incidence than the critical angle $\theta_c$ from being taken into account in the imprint images generated by the processing module 11, the sensor 124 does not comprise any light-sensitive photoreceptors at each sensor position that could be struck by a light ray arising from the finger D having a smaller angle of incidence with respect to the normal to the upper face 1200 than the critical angle $\theta_c$. In this manner, only items of information originating from the photoreceptors situated at positions that could be struck by light rays arising from the finger D after scattering in the finger D having an angle of incidence with respect to the normal to the upper face 1200 lying between the critical angle $\theta_c$ and the limit angle $\theta_l$ are used by the processing module 11 to form images of imprints.

In a particular implementation, each photoreceptor of the sensor 124 corresponding to a position that could be struck by a light ray arising from the finger D after scattering in the finger D having a smaller angle of incidence with respect to the normal to the upper face 1200 than the critical angle $\theta_c$ is masked by an opaque metallic layer, of for example aluminium. The photoreceptors situated below the opaque metallic layer therefore become light-insensitive and therefore cannot provide the processing module 11 with any items of information corresponding to light rays arising from the finger D after scattering in the finger D having a smaller angle of incidence with respect to the normal to the upper face 1200 than the critical angle $\theta_c$. It is known that a photoreceptor of a CCD or CMOS sensor struck by a light beam risks disturbing the photoreceptors in its neighbourhood, in particular when these photoreceptors are strongly saturated (for example when the sensor 124 is directed towards the sun). An advantage of this particular implementation is that the masking of the photoreceptors that could be struck by a light ray arising from the finger D after scattering in the finger D having a smaller angle of incidence with respect to the normal to the upper face 1200 than the critical angle $\theta_c$ prevents these photoreceptors from disturbing their neighbours.

To prevent the incidence zones from overlapping, the holes of the opaque screen 122 are arranged in such a way that the distance L, taken from centre to centre, between a hole and the hole or holes which are its nearest neighbours is greater than the diameter of an image of the finger D projected on the sensor 124 seen by a hole when the finger D is placed on the upper face 1200. If $d_T$ is the diameter of the hole, the diameter of the projection of the finger D on the sensor 124 seen by a hole $d_{AP}$ is given by:

$$d_{AP} = d_T + 2 \cdot E_{123} \cdot \tan(\theta_l)$$

and therefore:

$$L > d_{AP}$$

In a particular implementation, the holes of the opaque screen 122 are spaced apart by a distance $L > d_{AP}$ and, provided that the constraint on the distance L is complied with, are placed in an arbitrary manner on the opaque screen 122.

In a particular implementation, the holes of the opaque screen 122 are spaced apart by a distance $L > d_{AP}$ and placed regularly, for example in the form of a rectangular matrix or of a hexagonal mesh, on the opaque screen 122.

In FIG. 2, the photoreceptors of the sensor 124 which are represented in white (such as the photoreceptor 1241) are light-sensitive photoreceptors. The photoreceptors of the sensor 124 which are represented in black (such as the photoreceptor 1242) are light-insensitive photoreceptors.

Figure 3:
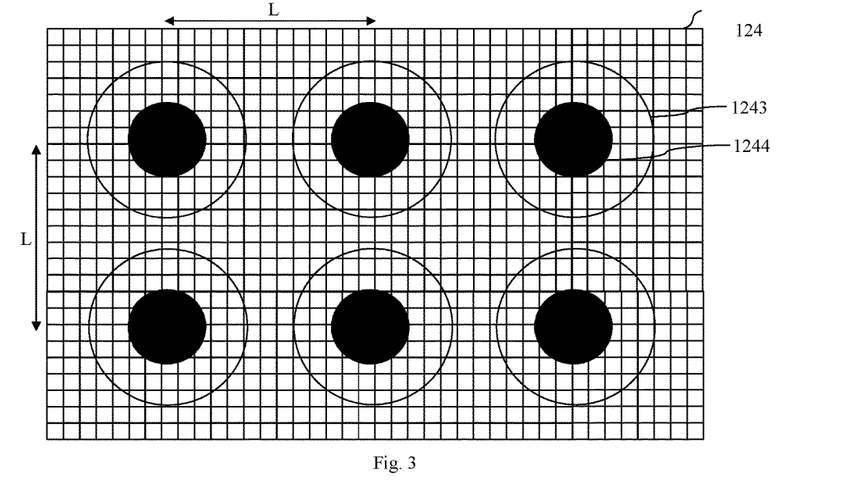
FIG. 3 schematically illustrates an end-on view of a sub-part of a light-sensitive sensor adapted for the first embodiment of the device for capturing an imprint of a body part.

FIG. 3 schematically illustrates an end-on view of a sub-part of the sensor 124 adapted for the first embodiment of the biometric device 12.

We consider here the case where the holes of the opaque screen 122 are spaced apart by a distance $L > d_{AP}$ and placed regularly in the form of a rectangular matrix of holes.

The sensor 124 consists of a matrix of square photoreceptors generally from "1" μm by "1" μm to "10" μm by "10" μm in size.

Superposed on the sensor 124 is represented a series of incidence zones distributed regularly over the sensor 124. Each incidence zone comprises a central disc such as the disc 1244 and a peripheral annulus such as the annulus 1243, the central disc and the peripheral annulus of an incidence zone being concentric. Each incidence zone corresponds to one of the holes of the opaque screen 122 and represents an image of the finger D projected on the sensor 124 seen by the said hole when the finger D is placed on the upper face 1200. For example, the incidence zone comprising the central disc 1244 and the peripheral annulus 1243 corresponds to the hole 122A. The diameter of each peripheral annulus therefore corresponds to the diameter $d_{AP}$ of an image of the finger D projected on the sensor 124 seen by a hole when the finger D is placed on the upper face 1200. The holes of the opaque screen 122 taking the form of a rectangular matrix of holes, the incidence zones follow this shape on the sensor 124. When the holes of the opaque screen 122 are circular, the centre of the incidence zone corresponding to a hole and the centre of the said hole are merged. The part situated in a peripheral annulus (for example the peripheral annulus 1243) corresponds to a zone receiving light rays that have passed through the opaque screen 122 via a hole (here the hole 122A) and that have an incident angle with the normal to the upper face 1200 lying between the critical angle $\theta_c$ and the limit angle $\theta_l$. The part situated inside the central disc (for example the central disc 1244) corresponds to a zone receiving light rays that have passed through the opaque screen 122 via a hole (here the hole 122A) and that have a smaller incident angle with the normal to the upper face 1200 than the critical angle $\theta_c$. Each part of the sensor 124 that is situated inside a central disc therefore corresponds to a part from which it is not desired to recover information. The photoreceptors situated in each of these parts must therefore be light-insensitive. Each part of the sensor 124 that is situated in a peripheral annulus therefore corresponds to a part from which it is desired to recover information. The photoreceptors situated in each of these parts must therefore be light-sensitive. The pixels situated outside of a peripheral annulus receive little, or indeed never, light originating from the finger if the refractive index of the finger placed on the upper face 1200 is smaller than the refractive index of the transparent plates 120 and 123.

It is noted that the distance L between each hole allows to image at least once each point of the finger D opposite the upper face 1200. The biometric device 12 having a known geometry, it is possible to determine which photoreceptor or photoreceptors of the sensor 124 images or image a point of the finger D. It then becomes possible to reconstruct an image of the imprint of the finger D by known techniques.

The processing module 11 takes into account the item of information arising from each photoreceptor having imaged a point to generate a representation of this point in the image of the imprint. During this generation of a representation, the processing module 11 mutually rebalances the items of information arising from each photoreceptor by taking into account, for each photoreceptor, an item of information representative of a distance between the said photoreceptor and the point which has been imaged. In a particular implementation, when one and the same point of the finger D is imaged by several photoreceptors of the sensor 124, subsequent to the rebalancing, the processing module 11 calculates an average of the items of information arising from each photoreceptor having imaged this point to generate a representation of this point in an imprint image.

In a particular implementation, the transparent plates 120 and 123 are "4.4" mm by "4.4" mm square glass plates with, as we saw above, refractive index $n_1=1.5$. The sensor 124 is a "3.9" mm by "3.9" mm square shape comprising "4" μm by "4" μm square photoreceptors.

In a particular implementation, the transparent plate 123 has a thickness $E_{123}$ three to ten times smaller than the thickness $E_{120}$ of the transparent plate 120. For example, the thickness $E_{123}=60$ μm and the thickness $E_{120}=300$ μm allow, when the two plates have the same refractive index, to obtain a magnification of $-\frac{1}{5}$ (i.e. an image of an object on the sensor 124 is five times smaller than the real object placed on the upper face 1200 and conversely a zone on the sensor 124 corresponds to a zone 5 times as large on the upper face 1200). In this particular implementation, the transparent plate 123 is cemented on the sensor 124 or produced through a series of depositions on the sensor 124.

Fingerprint imaging standards advocate finger image resolutions of greater than 500 or 1000 dots per inch (dpi). With a magnification of $-\frac{1}{5}$, if a finger image sampled at more than 500 dpi (resp. 1000 dpi) is desired, pixels of less than 10 μm (resp. less than 5 μm) are necessary.

In a particular implementation, the holes of the opaque screen 122 have a diameter of "7" μm and form a regular matrix of 10×10 holes in which the holes are spaced apart by a distance L=400 μm from centre to centre such as represented in FIG. 3. With a critical angle $\theta_c=41.8$ degrees, a limit angle $\theta_l=70$ degrees, a hole diameter of "7" μm and a thickness of the plate 123 of "60" μm, each central disc has a diameter of about "114" μm and each peripheral annulus has an exterior diameter of about "337" μm.

In a particular implementation, the lower face of the opaque screen 122 and the edges of the holes are rendered absorbent by applying known techniques (application of a black chromium layer, of an ink layer, texturing of the lower face, etc.) so as to minimize reflections between the opaque screen 122 and the sensor 124.

In a particular implementation, the LEDs, which are represented in FIG. 2 outside of the plates 120 and 123 for greater clarity, are either integrated on a lower face of the plate 120 (i.e. the face of the plate 120 which is in contact with the opaque screen 122), or integrated on the upper face of the plate 123 (i.e. the face of the plate 123 comprising the opaque screen 122).

In a particular implementation, the LEDs are gallium nitride (GaN) LEDs or OLEDs.

Figure 4A:
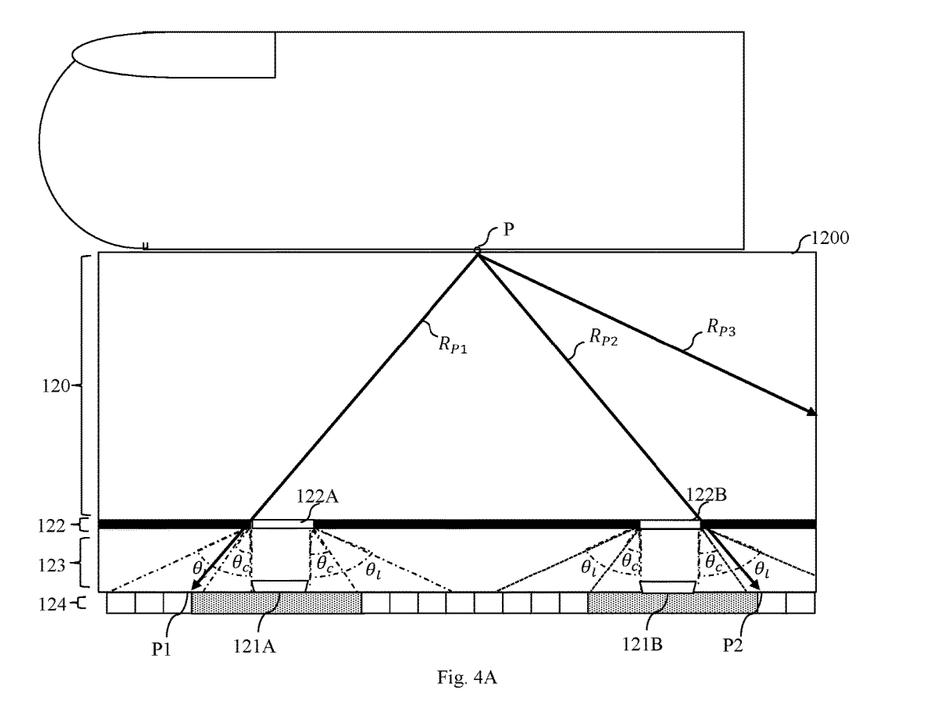
FIG. 4A schematically illustrates a second embodiment of the device for capturing an imprint of a body part.

FIG. 4A schematically illustrates a second embodiment of the biometric device 12 according to the invention.

In this embodiment, we again find the plate 120, the opaque screen 122, the plate 123 and the sensor 124.

In this embodiment, the light source is no longer situated at the level of the opaque screen 122. LEDs are inserted at the level of the sensor 124, i.e. under the opaque screen 122. At least some of the holes of the opaque screen 122 have an LED facing them.

In order that the whole of the finger D opposite the upper face 1200 scatters light, the holes of the opaque screen 122 having a LED facing them are arranged in such a way that each LED and the LED or LEDs which are the nearest neighbours of the said LED generate parts directly illuminated by the LEDs which are a distance δ apart that is smaller than the distance $d_p$.

Moreover, in order to avoid overlaps between the incidence zones, in all the particular implementations relating to the embodiment of FIG. 4A, the holes of the opaque screen 122 serving to image the finger D are arranged in such a way that the minimum distance L, taken from centre to centre, between a hole and the hole or holes which are its nearest neighbours is greater than the diameter of the image of the finger D seen by a hole when the finger D is placed on the upper face 1200, that is to say $L > d_{AP}$.

Each LED can be produced by deposition on the sensor 124. In this case, each LED is integrated on the surface of the sensor 124.

In a particular implementation, each LED is integrated into the sensor 124.

In a particular implementation, each LED generates a light beam directed towards the holes having a maximum angle of incidence $\theta_{max}$ with respect to a normal to the upper face 1200 allowing to prevent light-sensitive photoreceptors from being illuminated by these LEDs, after reflection on the opaque screen 122. In a particular implementation, $\theta_{max}=23$ degrees.

Figure 4B:
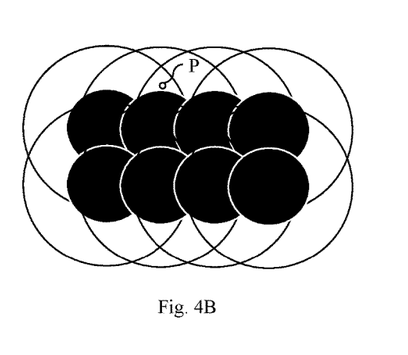
FIG. 4B schematically illustrates a functioning of the second embodiment of the device for capturing an imprint of a body part.
Figure 4C:
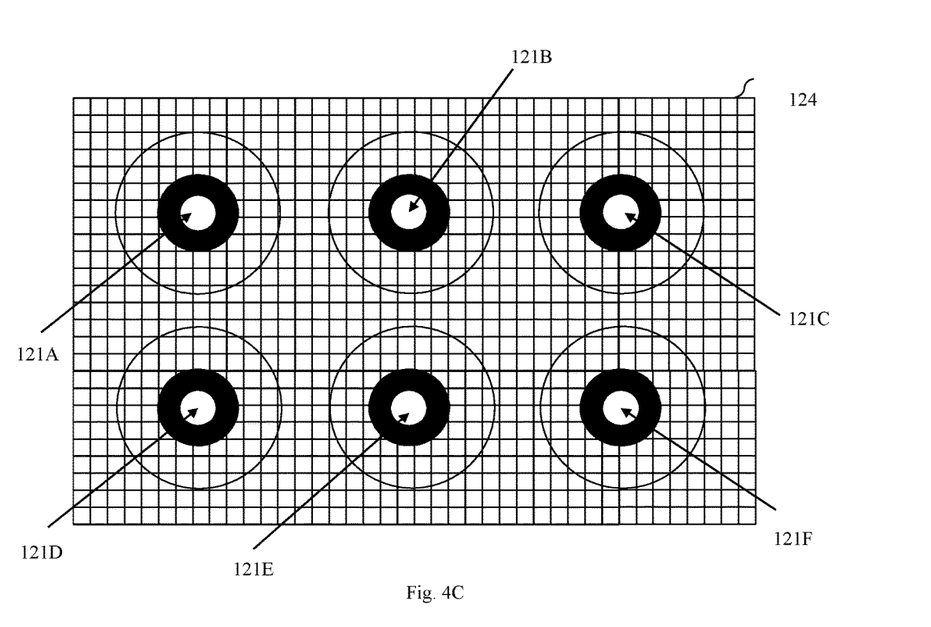
FIG. 4C schematically illustrates an end-on view of a sub-part of a sensor adapted for the second embodiment of the device for capturing an imprint of a body part.

FIG. 4C schematically illustrates an end-on view of a sub-part of an exemplary sensor 124 adapted for the second embodiment of the biometric device 12.

In the case of FIG. 4C, the holes of the opaque screen 122 form a rectangular matrix of holes.

In FIG. 4C, LEDs have been inserted at positions corresponding to the centre of each central disc. Again, there are the LEDs 121A and 121B represented in FIG. 4A, and LEDs 121C, 121D, 121E and 121F. A LED is therefore found at each position of the sensor 124 receiving light rays having passed through the opaque screen 122 via a hole and having a smaller incident angle with the normal to the upper face 1200 than the critical angle $θ_c$. In this particular implementation, there is therefore a LED positioned at the level of the sensor 124 facing each hole of the opaque screen 122. Therefore, in the same way that the holes form a matrix of holes on the opaque screen 122, the LEDs form a matrix of LEDs on the sensor 124. As in the first embodiment of the biometric device 12, the photoreceptors situated in a central disc are light-insensitive.

With circular holes, each LED illuminates a disc facing it on the finger D when the latter is placed on the upper face 1200. When, for example, the transparent plate 120 and the transparent plate 123 have respectively a thickness of $E_{123}$=60 μm and $E_{120}$=300 μm, the holes have a diameter of "7" μm, and each LED is circular with a diameter of "10" μm, each LED illuminates a disc of about "92" μm. With an opaque screen comprising regularly distributed holes with a distance of "400" μm between the centres of the holes, the whole surface of the finger D placed on the upper face 1200 is not illuminated by the LEDs. But, as we saw above, a finger being a scattering medium, the whole of the surface of the finger opposite the upper face 1200 will return light.

In this configuration, if an incidence zone on the upper face 1200 is projected through the hole of the opaque screen 122 corresponding to the said incidence zone, a projection of the central disc of diameter equal to about "544" μm and a projection of the peripheral annulus of exterior diameter equal to about "1656" μm are obtained. With regularly distributed holes with a distance of "400" μm between the centres of the holes, the projections of the peripheral annuli overlap.

FIG. 4B schematically illustrates a functioning of the second embodiment of the biometric device 12.

The device of FIG. 4C also features in FIG. 4B.

In FIG. 4B, we have represented the projections of 8 incidence zones on the upper face 1200. A point P, also represented in FIG. 4A, appears in the projection of three different peripheral annuli. This point P is therefore imaged three times on the sensor 124: a first time at a point P1 by following a ray $R_{P1}$, a second time at a point P2 by following a ray $R_{P2}$ and a third time at a point, not represented, by following a ray $R_{P3}$. Imaging each point of the finger D several times allows to obtain better image quality.

Each LED of the light source can be lit up independently of the other LEDs. It is for example possible to light up a single LED of the light source or all the LEDs of the light source.

Figure 6:
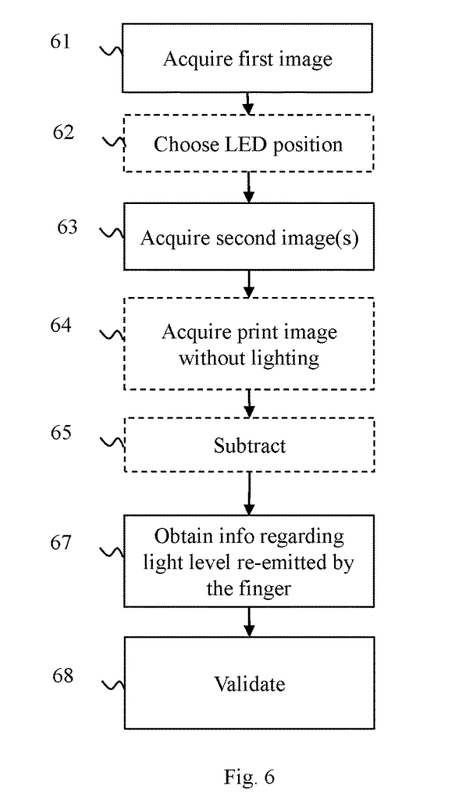
FIG. 6 describes a method of detecting fraud according to the invention.

FIG. 6 describes a method of detecting fraud according to the invention.

The method described in conjunction with FIG. 6 is implemented by the processing module 11 for example, subsequent to identification or authentication of a person. The biometric device 12 used can be either the biometric device 12 according to the first embodiment described in conjunction with FIG. 2 or else according to the second embodiment described in conjunction with FIG. 4A.

In a step 61, the processing module 11 causes an acquisition of a first imprint image by the biometric device 12 with a lighting of the finger D by the light source 121 such that the whole surface of the finger D in contact with the face 1200 returns light. As we saw above, among the light rays scattered by the finger D subsequent to the lighting by the LEDs of the light source 121, only the light rays having an angle of incidence with respect to the normal to the upper face 1200 that lies between the critical angle $θ_c$ and the limit angle $θ_l$ are used to create the first imprint image. Thus, the first image obtained is an image in which the pixels representing the ridges have a high light intensity and the pixels representing the valleys have a low light intensity with respect to the pixels of the ridges. The contrast between the ridges and the valleys is therefore significant.

In a step 63, the processing module 11 causes an acquisition of at least one second imprint image with a lighting of the body part by the light source 121 using an LED or a plurality of LEDs. When a plurality of LEDs is used, the said LEDs are at least a predefined distance apart. The predefined distance is such that the sub-part of the finger D returning the light emitted by a LED is disjoint from any other sub-part of the finger D returning light illuminated by another LED. When the LED is circular, a sub-part of the finger D returning light is defined as a circular zone of the finger D having a maximum light intensity at its centre and whose light intensity decreases radially to a minimum light intensity, the minimum light intensity being a predefined percentage (for example 1%) of the maximum light intensity. The minimum light intensity can also be defined as a light intensity which is not detectable by the sensor 124. The minimum light intensity therefore defines the limit of the sub-part of the finger D returning light. In a particular implementation, the processing module causes the lighting up of a single predefined LED of the light source 121 so as to allow an acquisition of a single second image. Thus, as in document FR3015728, only a well-defined and very restricted zone is illuminated directly on the part of the finger D opposite the face 1200. The second image is the most informative image for determining whether the finger D is covered with a true skin.

In a step 67, the processing module 11 obtains an item of information representative of a light level re-emitted by the finger D.

In a particular implementation, a light intensity profile is obtained for each sub-part of the finger D returning light. Accordingly, each sub-part of the finger D returning light is cut up into several calculation zones. When the LED is circular, a first central calculation zone has a disc shape and the other calculation zones are concentric annuli surrounding the central calculation zone. An average light intensity of the pixels is thereafter calculated for each calculation zone. The average light intensity of a zone is calculated on the basis of the pixels of the said zone representing ridges of the imprint. To identify pixels corresponding to ridges, the processing module uses the first image. In the first image, each pixel corresponding to a ridge has a high light intensity value with respect to a pixel corresponding to a valley. In a particular implementation, the light intensity value of each pixel of the first image is compared with a predefined threshold. On the basis of this comparison, each pixel of the first image is classed either in a first category corresponding to a ridge, or in a second category not corresponding to a ridge. The pixels whose light intensity value is greater than the predefined threshold are classed in the first category. The pixels whose light intensity value is smaller than or equal to the predefined threshold are classed in the second category.

An advantage of the biometric device 12 is that, since it uses the principle of total internal reflection with dark field, the first image that it generates comprises fewer pixels corresponding to defects of the face 1200 which could be interpreted by the processing module 11 as ridge pixels.

During the calculation of each average light intensity of a calculation zone, the processing module 11 verifies for each pixel of the second image corresponding to the said calculation zone whether the corresponding pixel in the first image was classed in the ridge pixel class. If this is the case, this pixel is taken into account in the calculation of the average. Otherwise, this pixel is not taken into account in the calculation of the average. On the basis of the light intensity average calculated for each calculation zone, the processing module 11 obtains a curve of light intensity and a curve of the light intensity gradient as a function of the distance between the calculation zone and the centre of the central calculation zone. The centre of the central calculation zone corresponds to the projection of the centre of the LED corresponding to this calculation zone on the upper face 1200.

Each curve obtained constitutes the item of information representative of the light level re-emitted by the finger D.

In a step 68, the processing module 11 compares the item of information representative of the light level re-emitted by the finger D with a reference item of information representative of a light level re-emitted by a true finger placed on the face 1200 so as to validate that the finger D placed on the face 1200 is a true finger. In order for the finger D to be validated, it is necessary that the light intensity curve (respectively the gradient curve) as a function of distance remains between two limit curves of light intensity (respectively two limit curves of light intensity gradient) estimated on the basis of reference curves. It is also possible to measure, for each point of a predefined plurality of points of the light intensity curve (respectively of the light intensity gradient curve), the disparity between the value of light intensity (respectively the value of the gradient) of the said point and a light intensity value of a corresponding point (i.e. situated at the same distance from the illuminated zone) on the two limit curves of light intensity (respectively the two limit curves of light intensity gradient), to sum in absolute value these disparities and to compare this sum with a predefined limit threshold.

The reference curves (i.e. the limit curves of light intensity and the limit curves of light intensity gradients) are here curves of light intensity and of gradients of light intensity which have been established on the basis of a vast array of true fingers by using the biometric device 12.

The light intensity of the pixels of the first image is a value representative of an effectiveness of light coupling between the sensor 124 and the finger D. In a particular implementation of step 67, the processing module 11 uses this item of information to reconstruct the light level emitted by the finger D. Accordingly, the processing module 11 calculates, for each calculation zone of the second image, a scalar product between the said calculation zone and a spatially corresponding zone in the first image (i.e. an identical annulus situated at the same position in the first image). For each zone, this scalar product is divided, for example, by the norm squared of the first image (i.e. by the scalar product of the first image by itself), so as to obtain a normalized scalar product for each zone. On the basis of the normalized scalar products calculated for each calculation zone, the processing module 11 obtains a curve of scalar products and a curve of gradients of scalar products as a function of the distance between the calculation zone and the illuminated zone. Each curve obtained in this particular implementation constitutes the item of information representative of the light level re-emitted by the finger D.

In this particular implementation, during step 68, the processing module 11 uses the curves thus obtained to validate or invalidate the finger D. In order for the finger D to be validated, it is necessary that the curve of scalar products (respectively the curve of gradients of scalar products) as a function of distance remain between two limit curves of scalar products (respectively two limit curves of gradients of scalar products) estimated here again on the basis of reference scalar product curves. Again, it is also possible to measure, for each point of a predefined plurality of points of the scalar product curve (respectively of the scalar product gradient curve), the disparity between the value of the scalar product (respectively the value of the gradient of the scalar product) of the said point and a value of scalar product of a corresponding point on the two limit scalar product curves (respectively the two limit scalar product gradient curves), to sum in absolute value these disparities and to compare this sum with a predefined limit threshold.

The reference curves are here curves of scalar products and of gradients of scalar products which have been established on the basis of a vast array of true fingers by using the biometric device 12.

It is noted that, in this particular implementation, other normalizations are possible.

Moreover, in this particular implementation, it is possible to use an albedo measurement in addition to the calculated values of normalized scalar product. This albedo measurement can be calculated on the first image in the form of an average or median light intensity value calculated over all the pixels of the said image or solely over the pixels corresponding to the ridges in the first image. The albedo measurement obtained is compared with reference albedo measurements obtained on the basis of a vast array of true fingers by using the biometric device 12. This albedo measurement is for example used to confirm or deny conclusions made about the validity of a finger on the basis of the curves of scalar products and/or curves of gradients of scalar products.

In a particular implementation of step 63, a plurality of LEDs is lit up. The LEDs of the said plurality are chosen so as to obtain several sub-parts of the finger D returning light, each sub-part being disjoint. In this particular implementation, for each sub-part a pair of curves is obtained comprising a curve of light intensity (respectively a curve of scalar products) and a curve of gradients of light intensity (respectively a curve of gradients of scalar products). Step 68 is applied to each pair of curves. In a particular implementation, if, during at least one application of step 68, it emerges that the finger D is not a true finger, then the processing module decides that it is in the presence of a false finger and therefore of a fraud.

In a particular implementation, during step 63, a plurality of second images is obtained by successively illuminating the finger D on the basis of at least one LED emitting in a different wavelength for each second image. For example, a first wavelength is situated below "600 nm" and a second wavelength is situated above "600 nm". For each wavelength, the processing module 11 implements steps 66, 67 and 68. If, during at least one application of step 68, it emerges that the finger D is not a true finger, then the processing module decides that it is in the presence of a false finger and therefore of a fraud. For each wavelength, the processing module uses during step 68 limit curves (i.e. limit curves of light intensity, of gradients of light intensity, of scalar products and of gradients of scalar products) adapted to each wavelength.

In a particular implementation, during a step 62 between steps 61 and 63, the processing module 11 chooses at least one LED to be lit up for the acquisition of each second image according to a predefined criterion. For example, when a single second image is acquired using a single LED, the LED lit up is the LED closest to a position of a barycentre of the part of the finger D in contact with the face 1200, or the LED closest to a position of the centre of curvature, also called the kernel, of the ridges of the part of the finger D in contact with the face 1200 such as defined in document EP3073416.

To facilitate the choice of one or more LEDs to be lit up, the processing module 11 can undertake a locating of the finger in the first image and choose each LED to be lit up as a function of the position of the finger thus located.

During a comparison of fingerprints, for example in an authentication method implemented by an authentication device, two images are compared: an image acquired by the authentication device, termed the acquired image, and an image of a reference imprint stored in a database, termed the reference image.

During the comparison, regions of the imprint of the acquired image are matched with regions of the imprint of the reference image. The matched regions are thereafter compared so as to undertake authentication.

In certain schemes, to decrease the complexity of the comparison, reliance is placed on particular points, called minutiae, corresponding to bifurcations and to ends of visible lines of an imprint. Each minutia of the acquired image is compared with a corresponding minutia of the reference image. On completion of each comparison, a resemblance score is calculated for each minutia, and an overall resemblance score is calculated for the whole of the imprint.

The matched regions and minutiae are representative of the most significant items of information of a imprint. It is therefore of great interest to search for possible frauds in the neighbourhood of these regions or of these minutiae.

In a particular implementation, the processing module 11 focuses on the minutiae detected in the ridges of the first image to determine whether the finger D is covered with a true skin. During step 62, the processing module 11 chooses an LED allowing to illuminate a point of the second image corresponding spatially to a barycentre of minutiae of the first image which are positively associated with minutiae of the reference image or corresponding spatially to the barycentre of a region of predefined shape of the first image comprising the greatest density of minutiae associated positively with minutiae of the reference image. The region of predefined shape may for example be a circle. This particular implementation allows to counter schemes consisting in juxtaposing a use of a finger covered with a false skin for authentication and of a true finger for validation of the finger.

Certain frauds consist in partially covering a finger with a false skin. In this case, two zones appear in the imprint image, these two zones being separated by a boundary. This boundary may resemble a scar. It is then relevant to verify that the light scattering properties in the finger are identical on each side of the boundary. Indeed, different scattering properties would indicate the presence of a fraud. In a particular implementation, subsequent to the acquisition of the first image, the processing module 11 performs an analysis of this first image so as to detect a possible boundary therein. If a boundary is detected, the processing module 11 chooses during step 62 a first LED illuminating on a first side of the detected boundary and a second LED illuminating on a second side of the detected boundary. During step 63, two second images are acquired by successively lighting up the first and the second chosen LEDs. The following steps of the method described in conjunction with FIG. 6 are applied independently to each second image. The finger is validated if, for each second image, during step 68, the processing module 11 declares the finger valid and if the item of information representative of the light level re-emitted by the finger D and obtained for the first second image is similar according to a predefined criterion to the item of information representative of the light level re-emitted by the finger D and obtained for the second image.

In a particular implementation, the method described in conjunction with FIG. 6 comprises two intermediate steps 64 and 65 between step 63 and step 67. During step 64, the processing module 11 triggers an acquisition of an additional image without lighting by the light source 121.

During step 65, the additional image is subtracted from the first and from each second image so that, thereafter in the method (i.e. steps 67 to 68), it is first and second images resulting from this subtraction that are used instead of the original first and second images.

This particular implementation allows to improve the performance of the method in case of illumination by at least one exterior light source.

Figure 7:
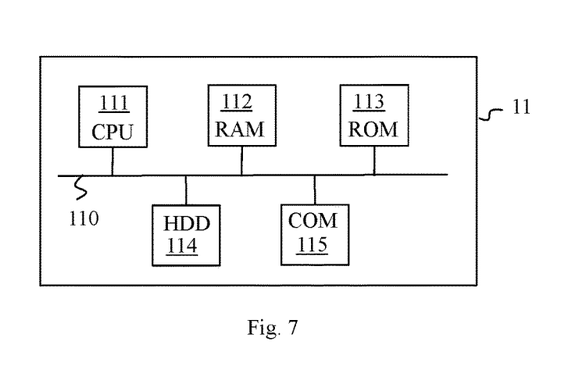
FIG. 7 schematically illustrates an exemplary hardware architecture of a processing module implementing the method of detecting fraud.

FIG. 7 schematically illustrates an exemplary hardware architecture of the processing module 11.

According to the exemplary hardware architecture represented in FIG. 7, the processing module 11 then comprises, linked by a communication bus 110: a processor or CPU ("Central Processing Unit") 111; a RAM ("Random Access Memory") 112; a ROM ("Read Only Memory") 113; a storage unit such as a hard disc or a storage medium reader, such as an SD ("Secure Digital") card reader 114; at least one communication interface 115 allowing the processing module 11 to communicate with the biometric device 12.

The processor 111 is capable of executing instructions loaded into the RAM 112 from the ROM 113, from an external memory (not represented), from a storage medium (such as an SD card), or from a communication network. When the analysis module 11 is powered up, the processor 111 is capable of reading instructions from the RAM 112 and of executing them. These instructions form a computer program causing the implementation, by the processor 111, of the method described in conjunction with FIG. 6.

The method described in conjunction with FIG. 6 can be implemented in software form by executing a set of instructions via a programmable machine, for example a DSP ("Digital Signal Processor"), a microcontroller or a GPU ("Graphics Processing Unit"), or be implemented in hardware form by a dedicated machine or component, for example an FPGA ("Field-Programmable Gate Array") or an ASIC ("Application-Specific Integrated Circuit").

It is noted that the processing module 11 could equally well have been included in the biometric device 12.

Moreover, the implementations described independently hereinabove for greater clarity can be combined.

The invention claimed is:

1. A method of detecting fraud during use of a device for capturing an imprint of a body part using a principle of total internal reflection with dark field, the said device comprising a first transparent plate comprising an upper face on which is placed a body part to be verified, a light source comprising a plurality of LEDs illuminating exclusively in the direction of the upper face, a light-opaque screen situated below the first transparent plate, a second transparent plate situated below the opaque screen and an image sensor situated below the second transparent plate, the two transparent plates, the opaque screen and the image sensor being parallel and the opaque screen comprising a network of holes intended to let light rays arising from the light source reach the said image sensor, the said light rays allowing the image sensor to generate an image of the said imprint, wherein the method comprises:

using the said device to acquire a first imprint image with a lighting of the body part to be verified by the light source, termed the first type of lighting, such that the whole surface of the body part to be verified in contact with the transparent plate returns light;

using the said device to acquire at least one second imprint image with a lighting of the body part to be verified by the light source, termed the second type of lighting, such that at least one LED is lit up; when a plurality of LEDs is lit up, the said LEDs are at least a predefined distance apart such that the sub-part of the finger D returning the light emitted by an LED is disjoint from any other sub-part of the finger D returning light illuminated by another LED;

obtaining for each second imprint image an item of information representative of a light level re-emitted by the body part to be verified by using the said second imprint image and the first imprint image; and comparing the said item of information with a reference item of information representative of a light level re-emitted by a true body part placed on the transparent plate so as to validate that the body part to be verified is a true body part.

2. The method according to claim 1, wherein the item of information representative of a light level re-emitted by the body part to be verified comprises at least one curve representing a light intensity emitted by the body part and/or at least one curve of gradients of light intensity emitted by the body part as a function of a distance from a centre of a zone directly illuminated by the light source when the latter illuminates the body part according to the second type of lighting, each curve being obtained by taking into account only light intensities of pixels corresponding to ridges of the imprint of the body part, the said pixels being identified by using the first imprint image.

3. The method according to claim 2, wherein when a plurality of LEDs is lit up simultaneously to obtain a second imprint image, the obtaining of the item of information representative of a light level re-emitted by the body part to be verified and the comparison of the said item of information with a reference item of information are performed for each sub-part so as to validate that the body part to be verified is a true body part.

4. The method according to claim 1, wherein the item of information representative of a light level re-emitted by the body part to be verified comprises at least one curve representing normalized scalar products calculated between the first and the second imprint images and/or at least one curve representing gradients of normalized scalar products calculated between the first and the second imprint images, as a function of a distance from a centre of a zone directly illuminated by the light source when the latter illuminates the body part according to the second type of lighting.

5. The method according to claim 4, wherein the item of information representative of a light level re-emitted by the body part to be verified furthermore comprises an albedo measurement, the said measurement being obtained on the basis of the first imprint image.

6. The method according to claim 1, wherein, when a plurality of second imprint images is obtained, the second type of lighting is modified for each second imprint image and the obtaining of the item of information representative of a light level re-emitted by the body part to be verified and the comparison of the said item of information with a reference item of information are performed for each second imprint image so as to validate that the body part to be verified is a true body part.

7. The method according to claim 6, wherein the modification of the second type of lighting consists in varying the wavelength emitted by the lighting system or the position of each lit-up LED of the lighting system for each second imprint image.

8. The method according to claim 1, wherein, prior to the acquisition of each second image, the method comprises choosing at least one LED to be lit up for the acquisition of each second image according to a first predefined criterion by using the first image.

9. The method according to claim 8, wherein the method furthermore comprises locating the finger in the first image and choosing each LED to be lit up as a function of the position of the finger thus located.

10. The method according to claim 8, wherein, when a boundary separating two zones is detected in the first imprint image, a first second imprint image is acquired by illuminating the body part with a first LED generating a sub-part returning light on a first side of the boundary and a second second imprint image is acquired by illuminating the body part with a second LED generating a sub-part returning light on a second side of the boundary, and the items of information representative of a light level re-emitted by the body part to be verified which arise from each second image having to be similar according to a second predefined criterion so as to validate that the body part to be verified is a true body part.

11. The method according to claim 10, wherein, when a single LED is chosen, the LED chosen is the LED closest to a position of a barycentre of the body part in contact with the transparent plate or closest to a centre of curvature of the ridges of the imprint of the body part in contact with the transparent plate, or closest to a barycentre of minutiae detected in the ridges of the said imprint.

12. The method according to claim 1, wherein the method furthermore comprises: acquiring an additional imprint image without lighting by the light source; performing a subtraction of the additional imprint image from the first and from each second image so that the first and each second imprint image used during the obtaining of the item of information representative of a light level re-emitted by the body part to be verified and the comparison of the said item of information with a reference item of information are images arising from this subtraction.

13. A device comprising circuitry for implementing the method according to claim 1.

14. Equipment comprising the device according to claim 13.

15. A non-transitory information storage medium, storing a computer program comprising program code instructions which can be loaded in a programmable device to cause said programmable device to implement the method according to claim 1, when the program code instructions are run by the programmable device.

* * * * *